United States Patent
Yu et al.

(10) Patent No.: US 9,423,242 B2
(45) Date of Patent: Aug. 23, 2016

(54) BOARD-WARPING MEASURING APPARATUS AND BOARD-WARPING MEASURING METHOD THEREOF

(71) Applicant: Test Research, Inc., Taipei (TW)

(72) Inventors: Liang-Pin Yu, New Taipei (TW); Ying-Lin Pan, New Taipei (TW); Chi-Yang Lin, Taipei (TW)

(73) Assignee: Test Research, Inc., Taipei (TW)

( * ) Notice: Subject to any disclaimer, the term of this patent is extended or adjusted under 35 U.S.C. 154(b) by 0 days.

(21) Appl. No.: 14/694,421

(22) Filed: Apr. 23, 2015

(65) Prior Publication Data

US 2016/0209206 A1  Jul. 21, 2016

(30) Foreign Application Priority Data

Jan. 20, 2015  (TW) .............................. 104101799 A

(51) Int. Cl.
  *G01B 11/14* (2006.01)
  *G01B 11/16* (2006.01)
  *G01B 11/25* (2006.01)

(52) U.S. Cl.
  CPC .......... *G01B 11/167* (2013.01); *G01B 11/2504* (2013.01); *G01B 11/2513* (2013.01)

(58) Field of Classification Search
  CPC ............. G01B 11/167; G01B 11/2504; G01B 11/2513
  USPC .......................... 356/601–625; 348/46, 47, 48
  See application file for complete search history.

(56) References Cited

U.S. PATENT DOCUMENTS

| | | | |
|---|---|---|---|
| 4,767,212 A | 8/1988 | Kitahashi et al. | |
| 8,260,030 B2 | 9/2012 | Kim et al. | |
| 8,437,533 B2 * | 5/2013 | Kim ................... | G01B 11/2513 348/86 |
| 8,949,060 B2 * | 2/2015 | Hwang ................. | G01B 11/24 702/1 |
| 9,062,966 B2 * | 6/2015 | Jeong ...................... | G06F 19/00 |
| 2002/0095304 A1 * | 7/2002 | Khazei ................ | G01R 31/002 702/127 |

(Continued)

FOREIGN PATENT DOCUMENTS

| | | |
|---|---|---|
| DE | 102013008273 A1 | 1/2014 |
| TW | I463133 B | 12/2004 |
| TW | 201415007 A | 4/2014 |
| TW | I436030 B | 5/2014 |
| TW | 201423033 A | 6/2014 |

OTHER PUBLICATIONS

Office Action issued in corresponding German Patent Application No. 102015110339.7, mailed Apr. 27, 2016.

*Primary Examiner* — Sang Nguyen
(74) *Attorney, Agent, or Firm* — Merchant & Gould P.C.

(57) ABSTRACT

A board-warping measuring method is configured to measure a device under test. The device under test is disposed on a measuring carrier. The board-warping measuring method includes: projecting a pattern onto the device under test, wherein the pattern includes plural reference points; capturing a measurement image by an image-capturing module when the pattern is projected onto the device under test, wherein the measurement image includes plural measurement points respectively corresponding to the reference points; calculating a position of each of the measurement points in the measurement image by utilizing a transfer function corresponding to each of the reference points to obtain position heights of the device under test corresponding to the measurement points; and compensating for board warping of the device under test based on the position heights of the device under test corresponding to the measurement points.

12 Claims, 16 Drawing Sheets

(56) References Cited

U.S. PATENT DOCUMENTS

| | | |
|---|---|---|
| 2004/0263862 A1 | 12/2004 | Amparan et al. |
| 2005/0057246 A1* | 3/2005 | Orozco .............. G01R 31/311 324/228 |
| 2009/0246486 A1 | 10/2009 | Sasaki |
| 2011/0228082 A1* | 9/2011 | Wen .................. G01B 11/2518 348/139 |
| 2013/0202727 A1 | 8/2013 | Kitazawa et al. |
| 2013/0278723 A1* | 10/2013 | Yu ..................... G01B 11/2531 348/46 |
| 2014/0022357 A1* | 1/2014 | Yu ......................... H04N 13/02 348/48 |

* cited by examiner

BOARD-WARPING MEASURING APPARATUS AND BOARD-WARPING MEASURING METHOD THEREOF

RELATED APPLICATIONS

This application claims priority to Taiwan Application Serial Number 104101799, filed Jan. 20, 2015, which is herein incorporated by reference.

BACKGROUND

1. Field of Invention

The present invention relates to a board-warping measuring apparatus. More particularly, the present invention relates to a board-warping measuring apparatus having a projection module for projecting a pattern onto a device under test.

2. Description of Related Art

In recent years, due to the reduction in the size of devices, many different types of automatic high-precision testing equipment have been developed for detecting the appearance of electronic components, wire connections, and whether alignment is correct. For example, automatic solder paste inspectors have been widely utilized in production lines to accurately measure the amount of solder pasted on substrates so as to serve as a necessary tool for process control in printed circuit board manufacturing.

In practical applications, printed circuit boards may be impacted by external stress or gravity to cause board warping. Board warping will result in a reduced accuracy when the device under test is measured by the measuring apparatus. For example, because of the deviation of the device under test in the vertical direction caused by warpage of the board, portions of the device under test which are intended to be measured are not within an optimal range of image-capturing focal length. Hence, the image thus captured is blurred.

A traditional board-warping measuring method is performed by employing a triangulation method, in which laser light is projected onto the device under test and a height of the device under test is calculated based on the reflected laser light. Next, a determination is made as to whether board warping of the device under test occurs. However, only the height of a small part of the device under test can be calculated by utilizing the laser light. In order to obtain the overall height of the device under test, the laser light needs to be projected onto every portion of the device under test in sequence. Such a process will lead to poor measurement efficiency, resulting in too much time being spent on the process.

For the forgoing reasons, there is a need to solve the above-mentioned problems by providing a board-warping measuring apparatus and a board-warping measuring method thereof.

SUMMARY

In order to solve the above-mentioned problems, the present invention provides a board-warping measuring method and a board-warping measuring apparatus to improve an efficiency and accuracy in measuring board warping of a device under test.

A board-warping measuring method is provided. The board-warping measuring method is configured to measure a device under test. The device under test is disposed on a measuring carrier. The board-warping measuring method comprises: projecting a pattern onto the device under test, wherein the pattern comprises a plurality of reference points; capturing a measurement image by an image-capturing module when the pattern is projected onto the device under test, wherein the measurement image comprises a plurality of measurement points respectively corresponding to the reference points; calculating a position of each of the measurement points in the measurement image by utilizing a transfer function corresponding to each of the reference points to obtain position heights of the device under test corresponding to the measurement points; and generating a board-warping compensation image corresponding to the device under test based on the position heights of the device under test corresponding to the measurement points so as to compensate for board warping of the device under test.

In the foregoing, before measuring the device under test the board-warping measuring method comprises: projecting the pattern onto a calibration plate disposed on the measuring carrier; capturing a plurality of calibration images by the image-capturing module when the pattern is projected onto the calibration plate on condition that the image-capturing module has a plurality of calibration heights relative to the calibration plate, wherein each of the calibration images comprises a plurality of calibration points respectively corresponding to the reference points; measuring a height of each of the calibration points in the calibration image corresponding to the each of the calibration points; and determining the transfer function based on a position and the height of the calibration point in each of the calibration images corresponding to a same reference point.

In the foregoing, the board-warping measuring method further comprises: selecting a measurement area from the measurement image based on an area under test in the device under test; selecting N effective measurement points adjacent to the measurement area from the measurement points, where $N \ge A$; and generating a compensation image for an inclined surface/curved surface corresponding to the area under test based on position heights of the device under test corresponding to the N effective measurement points so as to compensate for deformation of the device under test in the area under test.

In the foregoing, the reference points comprise at least one first reference point and a plurality of second reference points. A form of the at least one first reference point is different from a form of the second reference points.

In the foregoing, the pattern comprises a plurality of first lines and a plurality of second lines. The first lines cross the second lines to form the reference points.

The invention provides a board-warping measuring apparatus for measuring a device under test. The board-warping measuring apparatus comprises a measuring carrier, a projection module, an image-capturing module, and a processing module. The measuring carrier is configured to carry the device under test. The projection module is configured to project a pattern onto the device under test. The pattern comprises a plurality of reference points. The image-capturing module is configured to capture a measurement image when the pattern is projected onto the device under test. The measurement image comprises a plurality of measurement points respectively corresponding to the reference points. The processing module is configured to calculate a position of each of the measurement points in the measurement image by utilizing a transfer function corresponding to each of the reference points so as to obtain position heights of the device under test corresponding to the measurement points, and generate a board-warping compensation image corresponding to the device under test based on the position heights of the device under test corresponding to the measurement points so as to compensate for board warping of the device under test.

In the foregoing, before measuring the device under test, the board-warping measuring apparatus is configured to determine the transfer function. The measuring carrier is configured to carry a calibration plate. The projection module is configured to project the pattern onto the calibration plate. The image-capturing module is configured to capture a plurality of calibration images when the pattern is projected onto the calibration plate on condition that the image-capturing module has a plurality of calibration heights relative to the calibration plate. Each of the calibration images comprises a plurality of calibration points respectively corresponding to the reference points. The processing module is configured to measure a height of each of the calibration points in the calibration image corresponding to the each of the calibration points, and determine the transfer function based on a position and the height of the calibration point in each of the calibration images corresponding to a same reference point.

In the foregoing, the processing module is further configured to select a measurement area from the measurement image based on an area under test in the device under test, and select N effective measurement points adjacent to the measurement area from the measurement points, where NA, and generate a compensation image for an inclined surface/curved surface corresponding to the area under test based on position heights of the device under test corresponding to the N effective measurement points so as to compensate for deformation of the device under test in the area under test.

In the foregoing, the reference points comprise at least one first reference point and a plurality of second reference points. A form of the at least one first reference point is different from a form of the second reference points.

In the foregoing, the pattern comprises a plurality of first lines and a plurality of second lines. The first lines cross the second lines to form the reference points.

The invention further provides a board-warping measuring method. The board-warping measuring method is configured to measure a device under test. The device under test is disposed on a measuring carrier. The board-warping measuring method comprises: projecting a pattern onto the device under test, wherein the pattern comprises a plurality of reference points; capturing a measurement image by an image-capturing module when the pattern is projected onto the device under test, wherein the measurement image comprises a plurality of measurement points respectively corresponding to the reference points; checking a position of each of the measurement points in the measurement image in a lookup table to obtain position heights of the device under test corresponding to the measurement points; and generating a board-warping compensation image corresponding to the device under test based on the position heights of the device under test corresponding to the measurement points so as to compensate for board warping of the device under test.

In the foregoing, before measuring the device under test, the board-warping measuring method comprises: projecting the pattern onto a calibration plate disposed on the measuring carrier; capturing a plurality of calibration images by the image-capturing module when the pattern is projected onto the calibration plate on condition that the image-capturing module has a plurality of calibration heights relative to the calibration plate, wherein each of the calibration images comprises a plurality of calibration points respectively corresponding to the reference points; measuring a height of each of the calibration points in the calibration image corresponding to the each of the calibration points; and recording a position and the height of the calibration point in each of the calibration images corresponding to a same reference point to generate the lookup table.

In summary, the projection module projects the pattern having a specific form and the reference points onto the device under test, and rapidly determines whether board warping of the device under test has occurred based on the positions of the measurement points in the measurement image captured by the image-capturing module and the positions of the reference points in the pattern corresponding to the positions of the measurement points, and rapidly adjusts the position range of focal length of the image-capturing module. Next, through the transfer functions or the lookup table, the heights of the device under test can be rapidly obtained, and height compensation can be performed for board warping of the device under test. In addition, by utilizing the present invention method for measuring deformation, inclination or curving of part of the device under test can be further determined so as to perform calibrations and compensation accurately.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
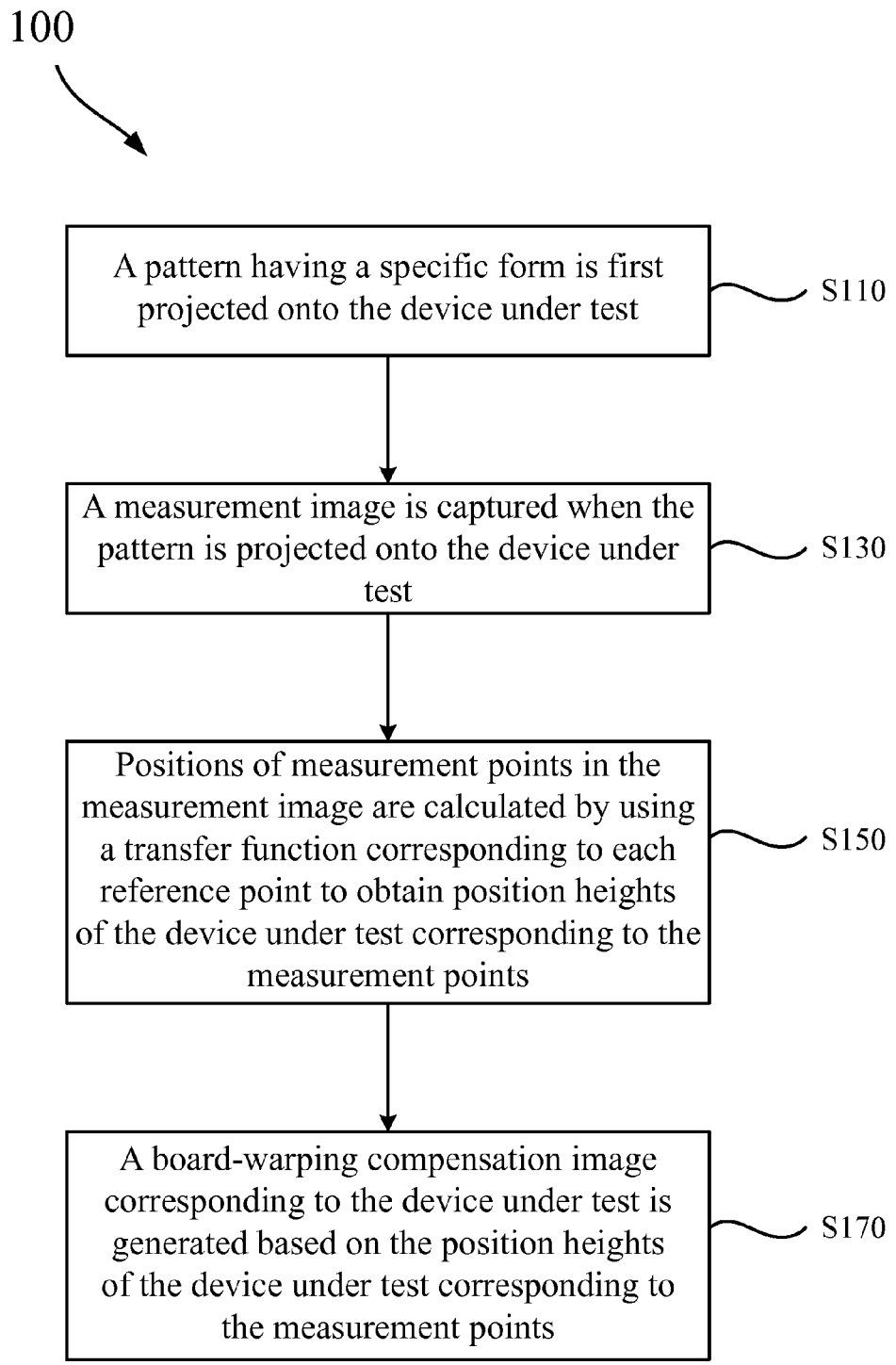
FIG. 1 depicts a flowchart of a board-warping measuring method according to one embodiment of this invention.

Reference will now be made in detail to the present embodiments of the invention, examples of which are illustrated in the accompanying drawings. However, the embodiments provided herein are intended as illustrative only since numerous modifications and variations therein will be apparent to those skilled in the art. Description of the operation does not intend to limit the operation sequence. Any structures resulting from recombination of devices with equivalent effects are within the scope of the present invention. In addition, drawings are only for the purpose of illustration and not plotted according to the original size. Wherever possible, the same reference numbers are used in the drawings and the description to refer to the same or like parts.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 2:
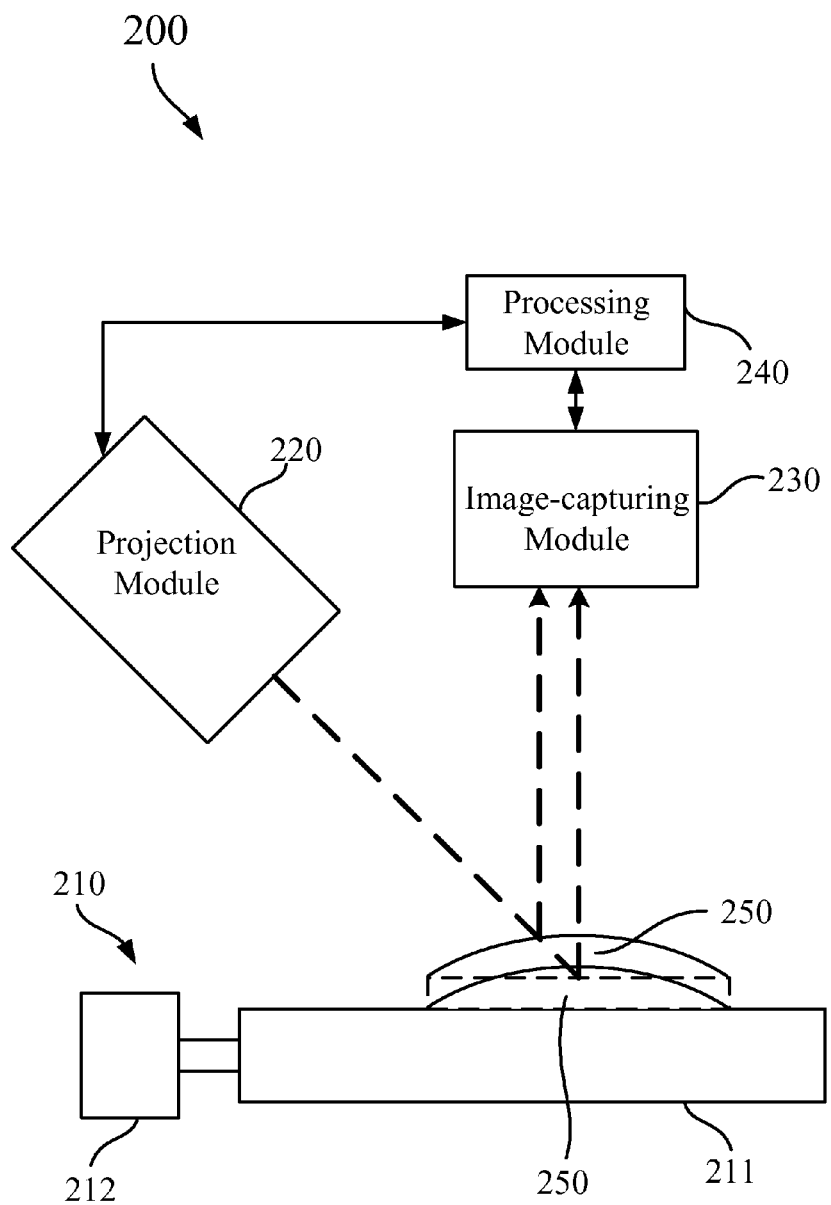
FIG. 2 depicts a schematic diagram of a board-warping measuring apparatus in conjunction with a board-warping measuring method according to one embodiment of this invention.

A description is provided with reference to FIG. 1 and FIG. 2. FIG. 1 depicts a flowchart of a board-warping measuring method 100 according to one embodiment of this invention.

FIG. 2 depicts a schematic diagram of a board-warping measuring apparatus 200 in conjunction with the board-warping measuring method 100 according to one embodiment of this invention. The board-warping measuring apparatus 200 in FIG. 2 only serves as an example for illustration. The present invention board-warping measuring method 100 is not limited to the hardware architecture of the board-warping measuring apparatus 200 shown in FIG. 2.

As shown in FIG. 2, the board-warping measuring apparatus 200 comprises a measuring carrier 210, a projection module 220, an image-capturing module 230, and a processing module 240. The measuring carrier 210 may comprise a platform 211 and a movable unit 212. The platform 211 is configured to carry a device under test 250. The movable unit 212 is configured to drive the platform 211 to move vertically. In this manner, the platform 211 can drive the device under test 250 to move vertically, but the present embodiment is not limited in this regard. In another embodiment, a position of the image-capturing module 230 may be moved vertically so that the image-capturing module 230 vertically moves relative to the device under test 250 to change a vertical height of the image-capturing module 230 relative to the device under test 250. The projection module 220 is disposed above the measuring carrier 210 and faces the device under test 250 in a specific direction or at a specific angle. The image-capturing module 230 is disposed right above the measuring carrier 210.

In one embodiment, the device under test 250 measured by the board-warping measuring apparatus 200 may comprise a printed circuit board, an optical sheet, or another substrate.

Figure 3A:
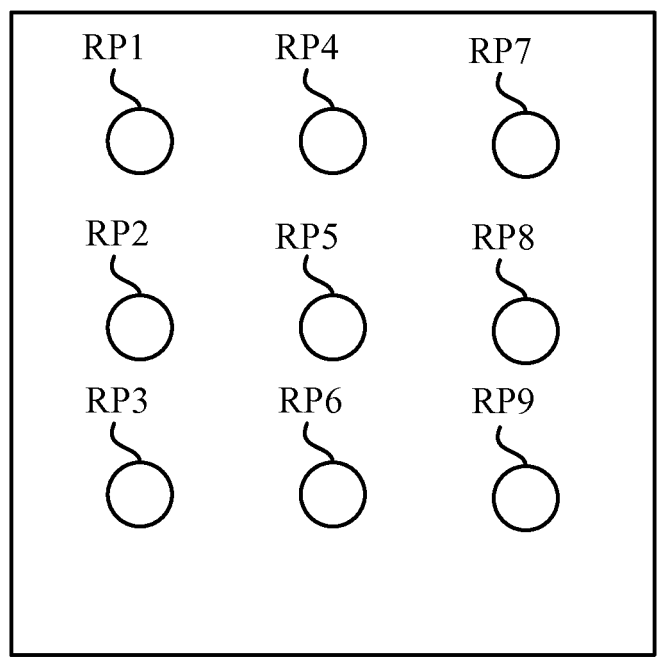
FIG. 3A depicts a schematic diagram of a pattern generated by a projection module according to one embodiment of this invention.

In the present embodiment, the projection module 220 may be a digital projection device configured to generate a pattern having a specific form. A description is provided with reference to FIG. 3A. FIG. 3A depicts a schematic diagram of a pattern 300A generated by the projection module 220 according to one embodiment of this invention. The pattern 300A may comprise a plurality of reference points RP1-RP9. To simplify matters, the reference points RP1-RP9 are uniformly distributed in the pattern 300A and have approximately the same shape and size, but the present embodiment is not limited in this regard. It should be noted that the pattern 300A in FIG. 3A only serves as an example for illustration. In other words, the shape and size of the pattern 300A and the number and positions of the reference points comprised in the pattern 300A may be changed depending on practical needs, and the present invention is not limited in this regard.

As shown in FIG. 1, in the board-warping measuring method 100, a pattern (such as the pattern 300A) having a specific form is first projected onto the device under test 250 by the projection module 220 in step S110. Subsequently, in step S130, a measurement image is captured by the image-capturing module 230 when the pattern 300A is projected onto the device under test 250A. Since the measurement image is an image formed by the pattern 300A projecting on the device under test 250, the measurement image also comprises a number of measurement points that corresponds to the number of the reference points RP1-RP9.

Figure 3B:
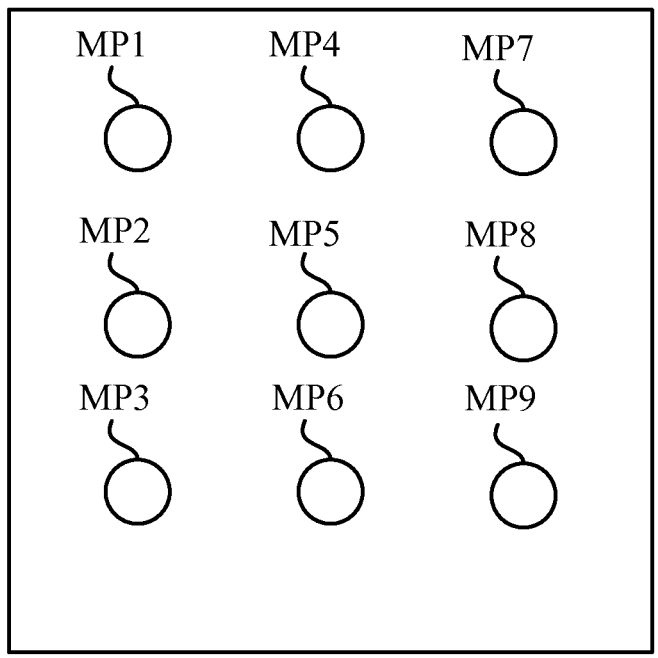
FIG. 3B depicts a schematic diagram of a measurement image captured by an image-capturing module according to one embodiment of this invention.
Figure 3C:
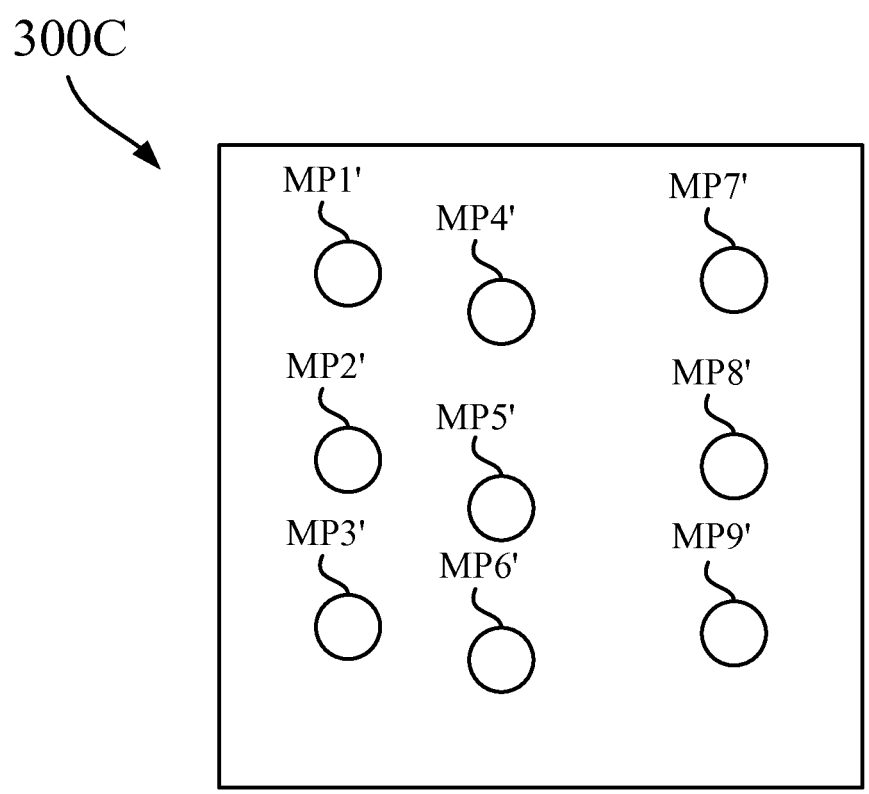
FIG. 3C depicts a schematic diagram of another measurement image captured by an image-capturing module according to another embodiment of this invention.

A description is provided with reference to FIG. 3B and FIG. 3C. FIG. 3B depicts a schematic diagram of a measurement image 300B captured by the image-capturing module 230 according to one embodiment of this invention. FIG. 3C depicts a schematic diagram of another measurement image 300C captured by the image-capturing module 230 according to another embodiment of this invention. Specifically, if the device under test 250 has not undergone any board warping, then a measurement image captured by the image-capturing module 230 should be the measurement image 300B in FIG.

3B. In other words, measurement points MP1-MP9 in the measurement image 300B are uniformly distributed in the measurement image 300B, which is the same as the reference points RP1-RP9 in the pattern 300.

However, if the device under test 250 has undergone board warping as shown in FIG. 2, then the measurement points in the measurement image captured by the image-capturing module 230 corresponding to convex portions of the device under test 250 will have deviations. In other words, the measurement image captured by the image-capturing module 230 should be similar to the measurement image 300C in FIG. 3C. In FIG. 3C, the measurement image 300C also comprises a number of the measurement points MP1'-MP9' that corresponds to the number of the reference points RP1-RP9, but the measurement points MP4'-MP6' have deviated from their original positions. That is to say, the positions on the device under test 250 corresponding to the measurement points MP4'-MP6' have undergone board warping.

Furthermore, with different heights of the device under test 250, the positions of the measurement points in the measurement image (such as the measurement image 300C) captured by the image-capturing module 230 will differ from each other. Hence, through calculating a deviation value of each of the measurement points (such as MP1'-MP9'), a position height of the device under test 250 corresponding to each of the measurement points can be obtained.

Therefore, in step S150, the positions of the measurement points (such as the measurement points MP1'-MP9') in the measurement image (such as the measurement image 300C) may further be calculated by using a transfer function corresponding to each of the reference points RP1-RP9 by the processing module 240 to obtain the position heights of the device under test 250 corresponding to the measurement points (such as the measurement points MP1'-MP9'). Specifically, the processing module 240 can transfer coordinates of the measurement points (such as the measurement points MP1'-MP9') in the measurement image (such as the measurement image 300C) to heights by respectively using the corresponding transfer functions.

Subsequently, in step S170, a board-warping compensation image is generated based on the position heights of the device under test 250 corresponding to the measurement points so as to compensate for the board warping the device under test 250. Specifically, if the position heights of the device under test 250 corresponding to the measurement points are approximately the same, the device under test 250 has not undergone board warping. Under such circumstances, an image of the device under test 250 captured by the image-capturing module 230 is a correct image and no further compensation is necessary. Conversely, if the position heights of the device under test 250 corresponding to some of the measurement points (such as the measurement points MP4'-MP6') are different from those corresponding to the other measurement points, the device under test 250 may have undergone board warping. Under such circumstances, the image of the device under test 250 captured by the image-capturing module 230 is an incorrect image. Since the actual position heights of the device under test 250 corresponding to the measurement points can be rapidly obtained through the transfer functions, the processing module 240 is allowed to perform compensation for height differences rapidly so as to obtain the correct mage of the device under test 250.

Figure 3D:
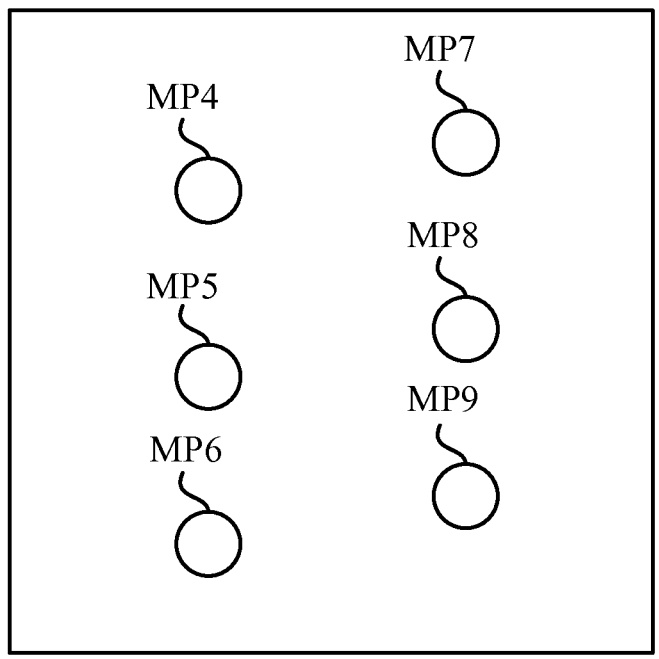
FIG. 3D depicts a schematic diagram of still another measurement image captured by an image-capturing module according to still another embodiment of this invention.

In the present embodiment, the reference points RP1-RP9 comprised in the pattern 300A have approximately the same shape and size and are uniformly distributed in the pattern 300A. However, when the deviation values of the measurement points corresponding to the reference points are too large, the processing module 240 may make an erroneous determination, as explained below. For example, a description is provided with reference to FIG. 3D. FIG. 3D depicts a schematic diagram of still another measurement image 300D captured by the image-capturing module 230 according to still another embodiment of this invention. According to the present embodiment, since the deviation values are too large, the image-capturing module 230 cannot capture the measurement points MP1-MP3 corresponding to the reference points RP1-RP3. In addition, the processing module 240 cannot determine whether the measurement point MP4 thus obtained corresponds to the reference point RP1 or the reference point RP4 in the pattern 300A. In the present embodiment, the processing module 240 can possibly make an erroneous determination that the measurement points MP1-MP3 correspond to the reference points RP1-RP3. Under such circumstances, the compensation performed by the processing module 240 based on the position heights of the device under test 250 corresponding to the measurement points will cause a problem.

Figure 4A:
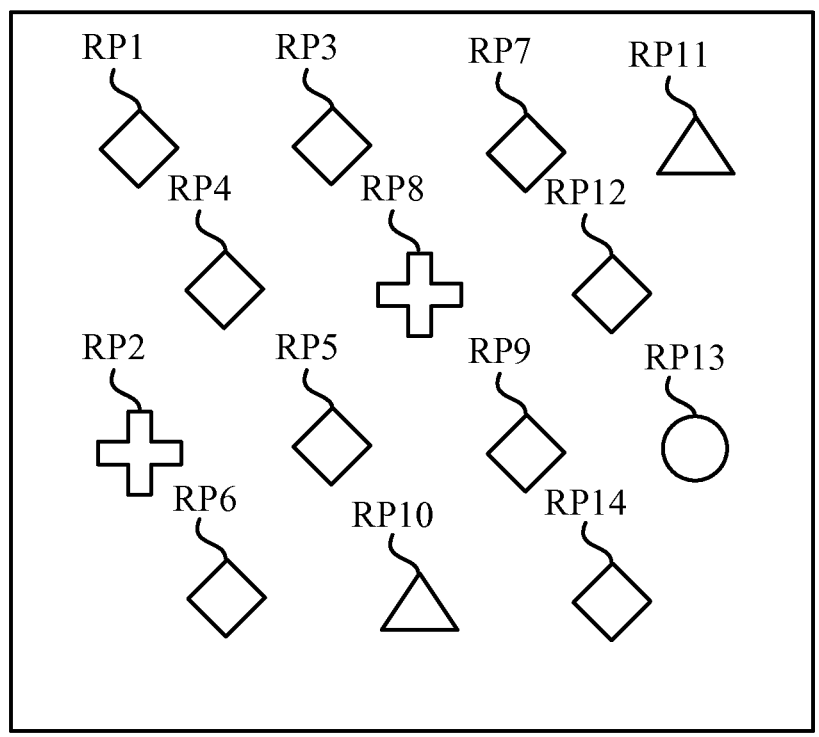
FIG. 4A depicts a schematic diagram of another pattern generated by a projection module according to another embodiment of this invention.

A description is provided with reference to FIG. 4A. FIG. 4A depicts a schematic diagram of another pattern 400A generated by a projection module 220 according to another embodiment of this invention. As shown in FIG. 4A, the pattern 400A comprises reference points RP1-RP16. According to the present embodiment, the reference points RP1-RP16 are not uniformly distributed in the pattern 400A, and the reference points RP1-RP16 comprise a plurality of reference points (such as the reference points RP2, RP8, RP10, RP11, and RP13) and other reference points (such as the reference points RP1, RP3-RP7, RP9, and RP12). The form of the other reference points is different from forms of the plurality of reference points. The form may comprise a shape, a size, or a color, etc. In the present embodiment, different shapes are taken as an example, but the present invention is not limited in this regard. In this manner, when the positions of the measurement points in the measurement image captured by the image-capturing module 230 are different from those of the reference points in the pattern 400A, the processing module 240 can determine which reference points the measurement points correspond to based on the measurement points corresponding to the reference points having different forms so as to avoid an erroneous determination. Subsequently, the processing module 240 compensates for board warping of the device under test 250 based on the deviation values of the measurement points corresponding to the correct reference points.

Figure 4B:
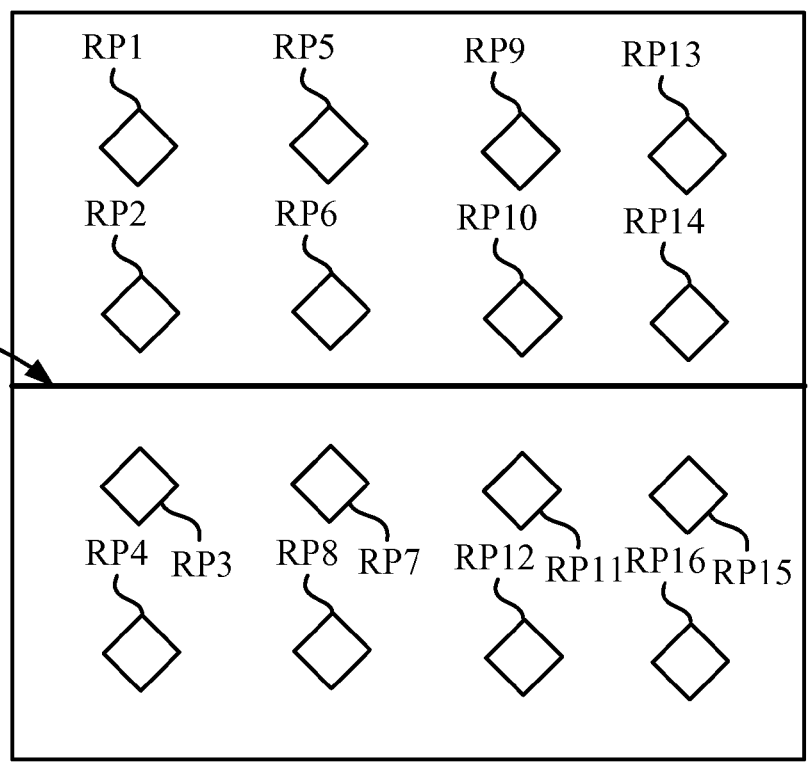
FIG. 4B depicts a schematic diagram of still another pattern generated by a projection module according to still another embodiment of this invention.

A description is provided with reference to FIG. 4B. FIG. 4B depicts a schematic diagram of still another pattern 400B generated by the projection module 220 according to still another embodiment of this invention. As shown in FIG. 4B, the reference points RP1-RP16 comprised in the pattern 400B are uniformly distributed in the pattern 400B and have approximately the same shape, size, and color. However, different from the pattern 300A in FIG. 3A, the pattern 400B further comprises a straight line 410 between the reference points RP2, RP6, RP10, RP14 and the reference points RP3, RP7, RP11, RP15. With such a configuration, the processing module 240 can determine which reference points the measurement points in the measurement image correspond to based on a straight line in the measurement image. It is noted that a straight line serves as an example in the pattern 400B according to the present embodiment, but the present invention is not limited in this regard.

Figure 4C:
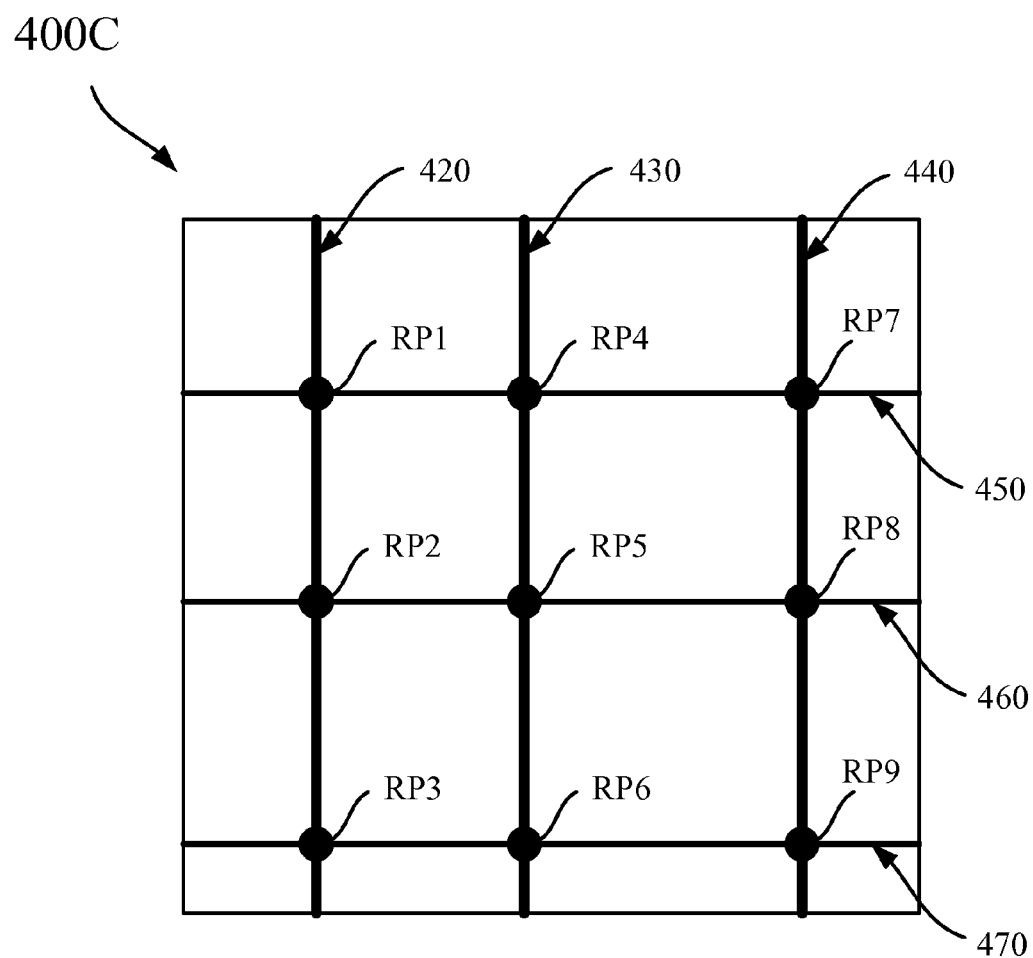
FIG. 4C depicts a schematic diagram of yet another pattern generated by a projection module according to yet another embodiment of this invention.

A description is provided with reference to FIG. 4C. FIG. 4C depicts a schematic diagram of yet another pattern 400C generated by the projection module 220 according to yet another embodiment of this invention. As shown in FIG. 4C, different from the patterns 300A, 400A, 400B, the pattern 400C comprises a plurality of lines 420-470. In the present embodiment, an example is given in which the lines 420-470 are straight, but the present invention is not limited in this regard. An interval distance between a certain pair of adjacent lines is different from that between any other pair of adjacent lines. A thickness of the lines 420, 430, 440 is different from a thickness of the lines 450, 460, 470, and the lines 420, 430, 440 cross the lines 450, 460, 470 to form the reference points RP1-RP9. With such a configuration, the processing module 240 can determine which reference points the measurement points in the measurement image correspond to based on lines in the measurement image corresponding to the lines 420-470 in the pattern 400C.

It is noted that the patterns of the above-mentioned embodiments only serve as examples and are not intended to limit the scope of the present disclosure. In other words, those of ordinary skill in the art may perform modifications and variations to the patterns without departing from the scope or spirit of the present disclosure.

It is noted that since the board-warping measuring method 100 provided by the present invention generates the pattern through the projection module 220, the projection module 220 may be a projection device, such as a digital projector, and the pattern can be generated and changed very easily. When the processing module 240 cannot perform a determination based on the measurement image generated by a specific pattern, users can generate another pattern (such as a pattern having a greater number of reference points) at any time by utilizing the projection module 220 to perform measurement. Since the instrument for projecting light in the traditional board-warping measuring method needs an optical grating and the optical grating needs to be replaced based on different devices under test and different measuring methods, the operating complexity and cost are both high. In consideration of this, the method provided by the present invention is simpler to operate and provides for greater flexibility.

Figure 5A:
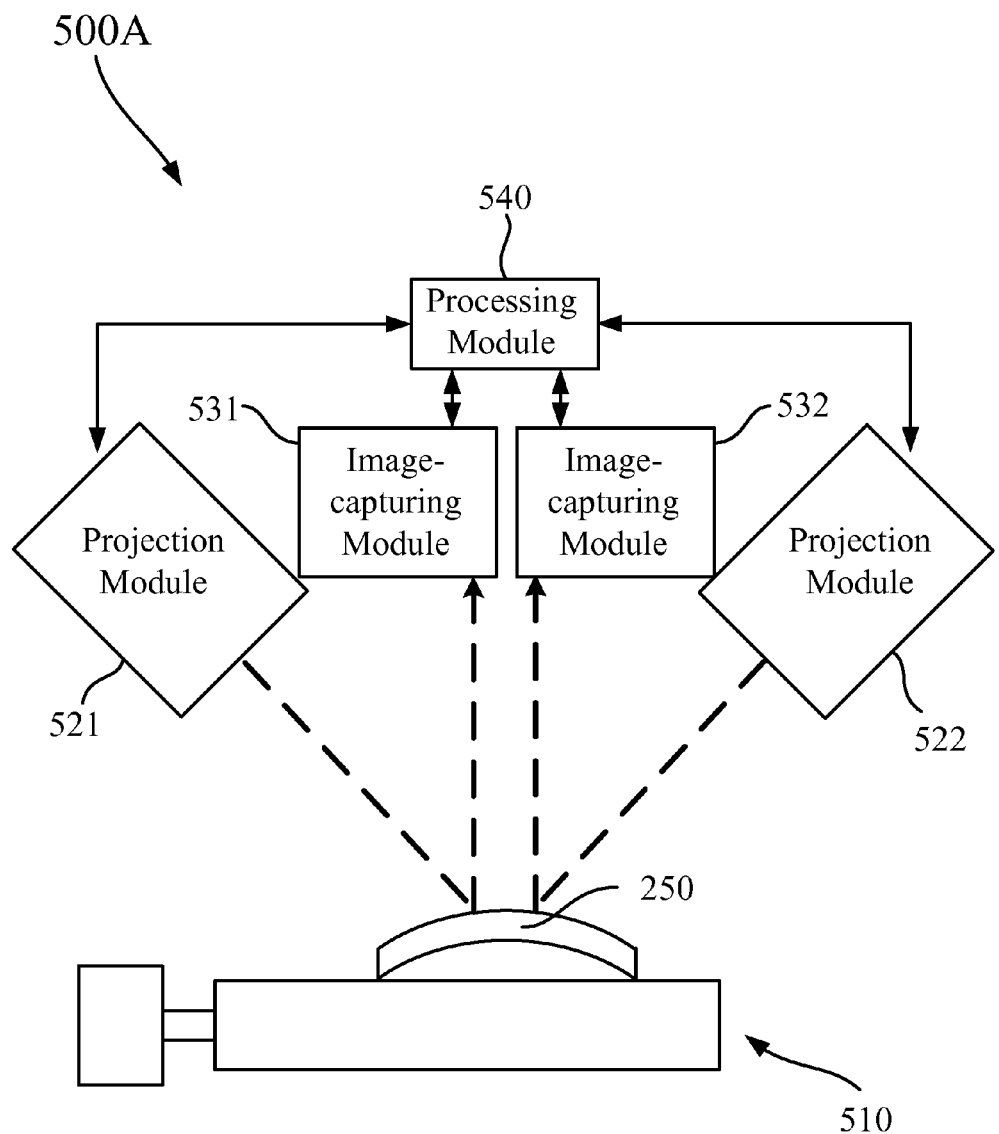
FIG. 5A depicts a schematic diagram of another board-warping measuring apparatus in conjunction with a board-warping measuring method according to another embodiment of this invention.

A description is provided with reference to FIG. 5A. FIG. 5A depicts a schematic diagram of another board-warping measuring apparatus 500A in conjunction with the board-warping measuring method 100 according to another embodiment of this invention. However, the board-warping measuring method 100 of the present invention is not limited to the hardware architecture of the board-warping measuring apparatus 500A shown in FIG. 5A. As shown in FIG. 5A, similar to the board-warping measuring apparatus 200 in FIG. 2, the board-warping measuring apparatus 500A comprises a measuring carrier 510, a plurality of projection modules 521, 522, a plurality of image-capturing modules 531, 532, and a processing module 540. Since the operations of the measuring carrier 510, the projection modules 521, 522, the image-capturing modules 531, 532, and the processing module 540 are similar to those of the measuring carrier 210, the projection module 220, the image-capturing module 230, and the processing module 240 in FIG. 2, a description in this regard is not provided.

According to the present embodiment, the board-warping measuring apparatus 500A comprises the plurality of projection modules 521, 522 and the plurality of image-capturing modules 531, 532. To simplify matters, the numbers of the projection modules and the image-capturing modules in the present embodiment are both two, but the present invention is not limited in this regard. In FIG. 2, since the projection module 220 is in a specific direction from the device under test 250, it is possible that raised components in the device under test 250 cause shadows in the measurement image obtained by the image-capturing module 230 when the projection module 220 projects the pattern onto the device under test 250.

However, in the present embodiment, the projection modules 521, 522 are disposed above the measuring carrier 510, and the projection module 522 is disposed in a different direction from the projection module 521. In other words, the projection module 522 can project the pattern onto the device under test 250 along a direction different from the projection module 521. The image-capturing module 531 can be configured to capture an image projected onto the device under test 250 by the projection module 521, and the image-capturing module 532 can be configured to capture an image projected onto the device under test 250 by the projection module 522. In this manner, the shadows generated by a single image-capturing module can be avoided. In addition, the processing module 540 can process measurement images captured by the image-capturing modules 531, 532 separately to accelerate the speed of determining whether board warping has occurred.

Figure 5B:
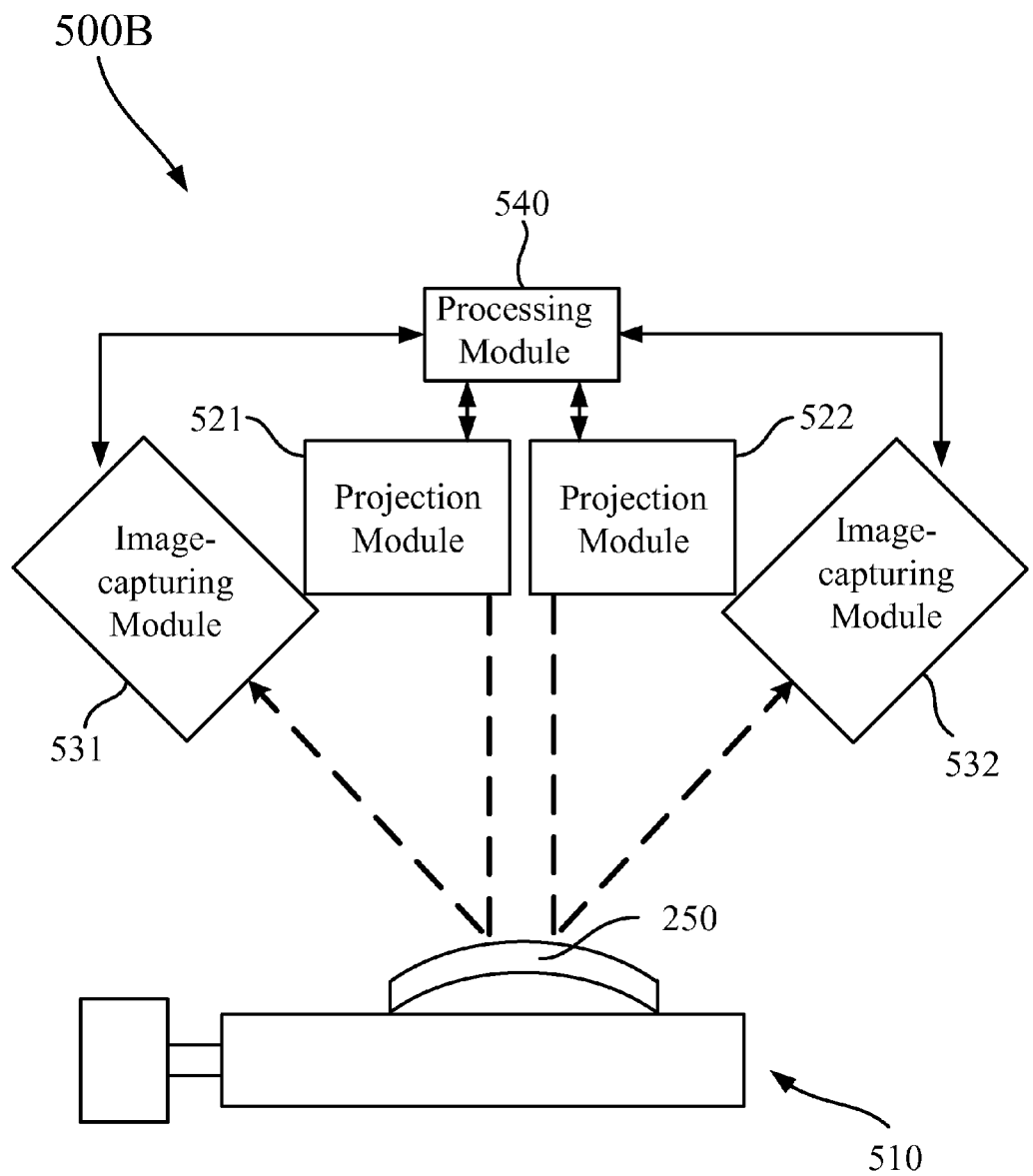
FIG. 5B depicts a schematic diagram of still another board-warping measuring apparatus in conjunction with a board-warping measuring method according to still another embodiment of this invention.

A description is provided with reference to FIG. 5B. FIG. 5B depicts a schematic diagram of still another board-warping measuring apparatus 500B in conjunction with the board-warping measuring method 100 according to still another embodiment of this invention. However, the board-warping measuring method 100 of the present invention is not limited to the hardware architecture of the board-warping measuring apparatus 500B shown in FIG. 5B. As shown in FIG. 5B, since the operation of the board-warping measuring apparatus 500B is similar to that of the board-warping measuring apparatus 500A in FIG. 5A, a description in this regard is not provided.

According to the present embodiment, the projection modules 521, 522 are disposed right above the measuring carrier 510. The image-capturing modules 531, 532 are disposed above the measuring carrier 510 and face the device under test 250 in different directions. In other words, when compared with the board-warping measuring apparatus 500A, positions of the projection modules 521, 522 are exchanged with positions of the image-capturing modules 531, 532. That is to say, the positions of the projection modules and the image-capturing modules of the board-warping measuring apparatus applied to the board-warping measuring method 100 of the present invention may be determined depending on practical needs, and the present invention is not limited in this regard.

Figure 6:
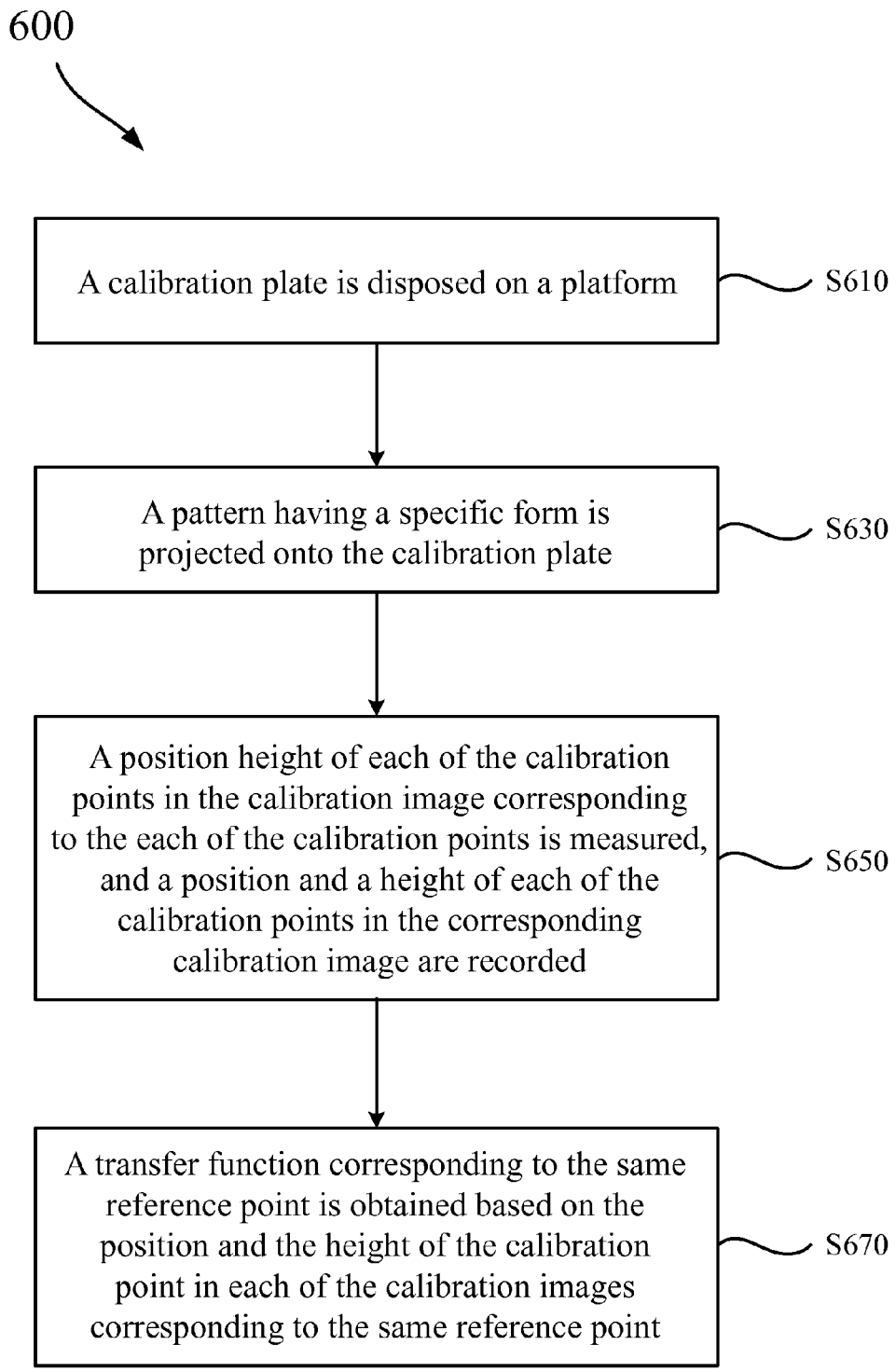
FIG. 6 depicts a flowchart of a method for generating a transfer function according to one embodiment of this invention.

A description is provided with reference to FIG. 6. FIG. 6 depicts a flowchart of a method for generating a transfer function 600 according to one embodiment of this invention. Specifically, the method for generating the transfer function 600 pre-establishes a transfer function of each of reference points before measuring the device under test 250, such that position heights of the device under test 250 corresponding to measurement points can be rapidly obtained once the measurement points in a measurement image are learned when measuring the device under test 250.

The method for generating the transfer function 600 are in conjunction with the board-warping measuring apparatus 200 in FIG. 2, the board-warping measuring apparatus 500A in FIG. 5A, or the board-warping measuring apparatus 500B in FIG. 5B, and the pattern 300A in FIG. 3A, the pattern 400A in FIG. 4A, the pattern 400B in FIG. 4B, or the pattern 400C in FIG. 4C. In the present embodiment, the method for generating the transfer function 600 using the board-warping measuring apparatus 200 in FIG. 2 and the pattern 300A in FIG. 3A is taken as an example, but the present invention is not limited in this regard.

First, in step S610, a calibration plate is disposed on the platform 211. Next, in step S630, a pattern (such as the pattern 300A) having a specific form is projected onto the calibration plate by the projection module 220. Subsequently, a distance between the platform 211 and the image-capturing module 230 is changed (such as through driving the movable unit 212 or moving the image-capturing module 230) so as to capture a plurality of calibration images by the image-capturing module 230 when the pattern 300A is projected onto the calibration plate under the circumstance that the image-capturing module 230 has a plurality of calibration heights relative to the platform 211. Similarly, each of the calibration images comprises a plurality of calibration points respectively correspond to the reference points RP1-RP9 in the pattern 300A.

Next, in step S650, a position height of each of the calibration points in the calibration image corresponding to the each of the calibration points is measured, and a position and a height of each of the calibration points in the corresponding calibration image are recorded. In one embodiment, the position height of each of the calibration points in the corresponding calibration image can be measured by utilizing a triangulation method. Subsequently, in step S670, a transfer function corresponding to the same reference point is obtained based on the position and the height of the calibration point in each of the calibration images corresponding to the same reference point.

Figure 7:
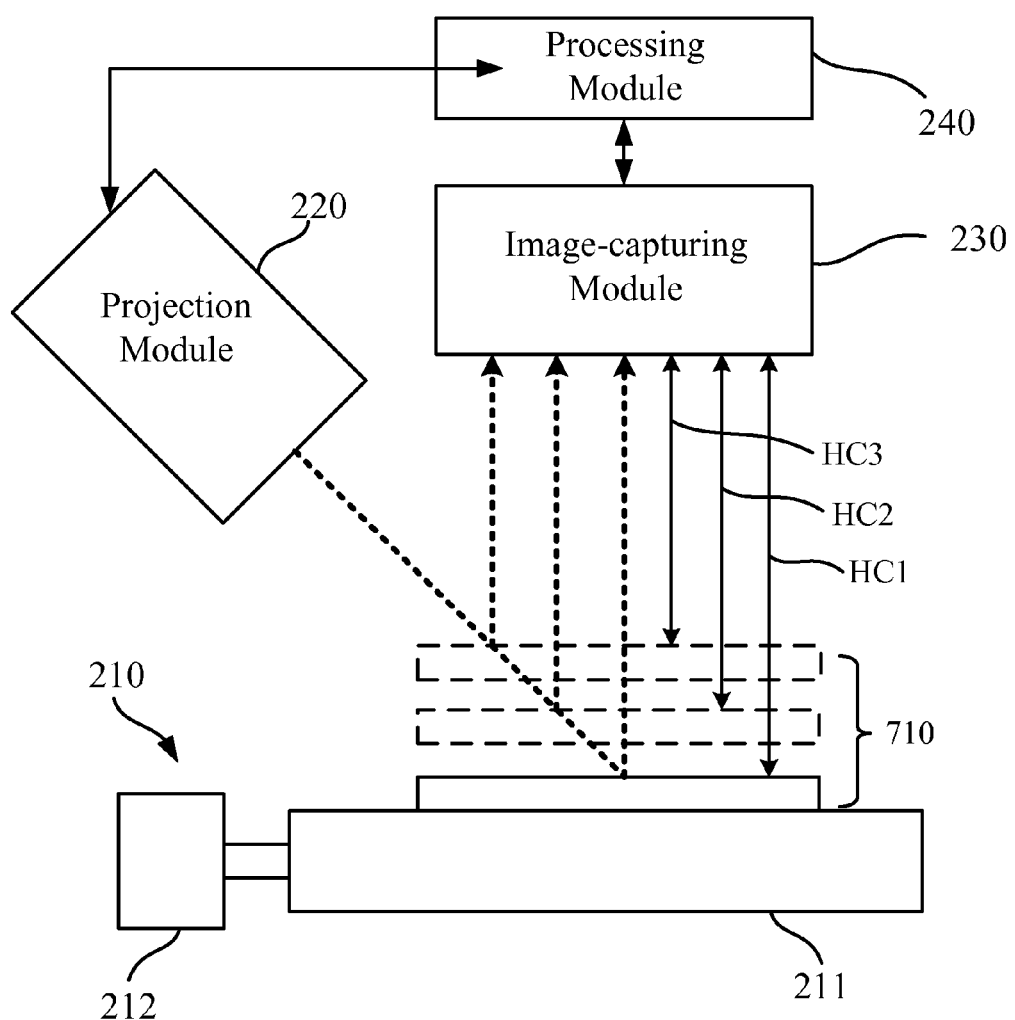
FIG. 7 depicts a schematic diagram of calibration images captured by an image-capturing module at different calibration heights according to one embodiment of this invention.
Figure 8A:
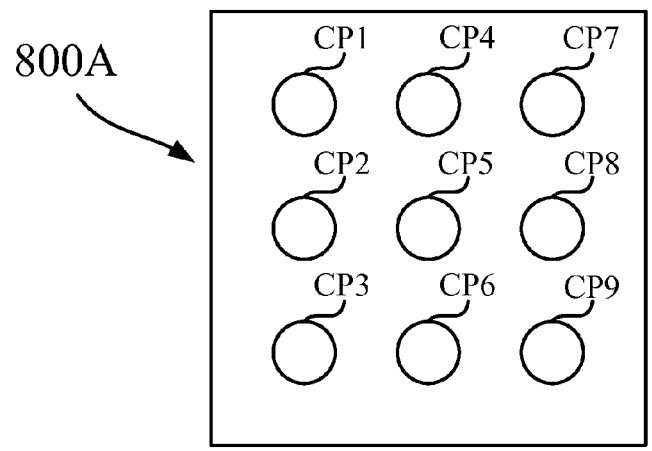
FIG. 8A depicts a schematic diagram of a calibration image captured at a calibration height according to one embodiment of this invention.
Figure 8B:
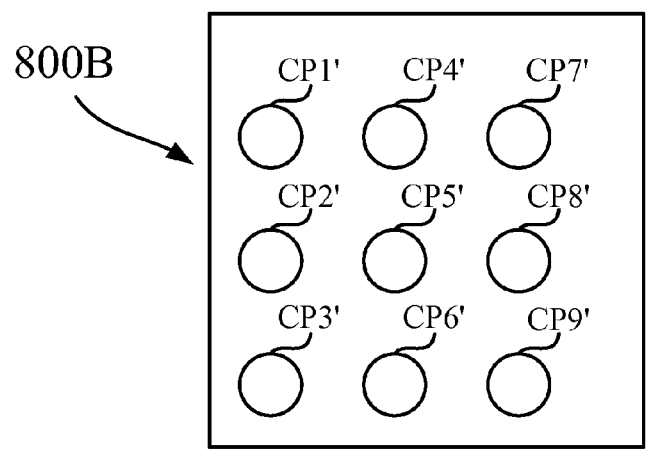
FIG. 8B depicts a schematic diagram of a calibration image captured at another calibration height according to one embodiment of this invention.
Figure 8C:
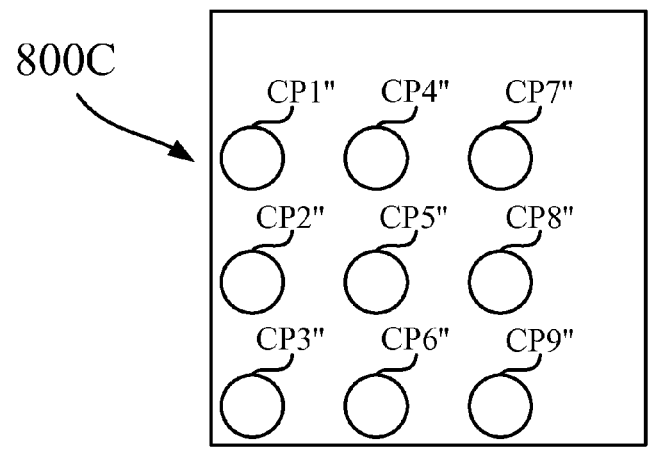
FIG. 8C depicts a schematic diagram of a calibration image captured at still another calibration height according to one embodiment of this invention.

A description is provided with reference to FIG. 7, FIG. 8A, FIG. 8B, and FIG. 8C. FIG. 7 depicts a schematic diagram of calibration images captured by the image-capturing module 230 at different calibration heights according to one embodiment of this invention. FIG. 8A depicts a schematic diagram of a calibration image 800A captured at a calibration height HC1 according to one embodiment of this invention. FIG. 8B depicts a schematic diagram of a calibration image 800B captured at another calibration height HC2 according to one embodiment of this invention. FIG. 8C depicts a schematic diagram of a calibration image 800C captured at still another calibration height HC3 according to one embodiment of this invention. As shown in FIG. 7, users can project a pattern (such as the pattern 300A) having a specific form onto a calibration plate 710 by utilizing the projection module 220. Next, users can render the image-capturing module 230 to have the plurality of calibration heights HC1-HC3 relative to the calibration plate 710 by driving the movable unit 212 or moving the image-capturing module 230, and respectively capture the calibration images 800A-800C on the calibration plate 710 at the calibration heights HC1-HC3. Similarly, under normal circumstances, the calibration image 800A may comprise a number of calibration points CP1-CP9 that corresponds to the number of the reference points (such as the reference points RP1-RP9) in the pattern (such as the pattern 300A). The calibration image 800B may comprise a number of calibration points CP1'-CP9' that corresponds to the number of the reference points (such as the reference points RP1-RP9) in the pattern (such as the pattern 300A). The calibration image 800C may comprise a number of calibration points CP1"-CP9" that corresponds to the number of the reference points (such as the reference points RP1-RP9) in the pattern (such as the pattern 300A).

Since a projection angle of the projection module 220 is not changed, the calibration points in the calibration image will deviate when the calibration height is different. As shown in FIG. 8A, FIG. 8B, and FIG. 8C, when a distance between the calibration plate 710 and the image-capturing module 230 changes from the calibration height HC1 to the calibration height HC3, positions of the calibration points CP1"-CP9" in the calibration image 800C and positions of the calibration points CP'-CP9' in the calibration image 800B have been changed relative to positions of the calibration points CP1-CP9 in the calibration image 800A.

In addition, positions (such as coordinates) of the calibration points in each of the calibration images can be recorded by the processing module 240, and heights of the calibration points can be measured by utilizing a triangulation method. Hence, through the position and the height of the calibration point in each of the calibration images corresponding to the same reference point, a relationship between the position and the height of the calibration point, that is, the transfer function corresponding to the reference point can thus be obtained.

In one embodiment, position information of the reference points at different heights is obtained and a transfer function is obtained by utilizing regression. A mode of the transfer function may be a linear polynomial or a polynomial higher than a linear polynomial, a trigonometric function, or an exponential function, etc., but the present invention is not limited in this regard. Specifically, the mode of the transfer function is determined based on the position and the height of the calibration point in each of the calibration images corresponding to the same reference point and an error range. The more complex the relationship between the position and the height of the calibration point is and the smaller the error of the measurement result is desired, the higher order the transfer function is and the more terms the transfer function has so as to express the relationship between the position and the height of the calibration point in each of the calibration images corresponding to the same reference point.

For example, it is assumed that the transfer function is $h(x,y)=ax+by$, where $h(x,y)$ is the height of the calibration point, and $(x,y)$ is the coordinate of the calibration point. The coordinate of the calibration point CP1 in the calibration image 800A corresponding to the reference point RP1 is $(3,-3)$, and the height of the calibration point CP1 is 300 millimeters(mms). The coordinate of the calibration point CP1' in the calibration image 800B corresponding to the reference point RP1 is $(2.5,-4)$, and the height of the calibration point CP1' is 350 millimeters. The above obtainable variables are substituted into the above equations to solve the simultaneous equations, then the transfer function corresponding to the reference point RP1 is obtained as $h(x,y)=100/3*x-200/3*y$. In this manner, when the board-warping measuring method 100 is utilized to measure the device under test 250, the coordinate of the measurement point in the measurement image corresponding to the reference point RP1 can be substituted into the corresponding transfer function $h(x,y)=100/3*x-200/3*y$ to rapidly obtain the height of the device under test 250 corresponding to the measurement point.

However, for the calibration image 800C, the height of the calibration point CP1" is 380 millimeters when the coordinate of the calibration point CP1" corresponding to the reference point RP1 is $(2,-5)$, but the ideal height of the calibration point corresponding to the reference point RP1 is obtained to be 400 millimeters by utilizing the above transfer function $h(x,y)=100/3*x-200/3*y$. An error of 20 millimeters thus exists between the ideal height and the actual height of 380 millimeters which is obtained by performing a measurement of the height. Under these circumstances, it may be necessary to assume that the transfer function is a polynomial having a higher order and more terms or another function (such as a trigonometric function, an exponential function, etc.) to express the relationship between the positions and the heights of the calibration points CP1, CP1', and CP1" in all the calibration images (such as the calibration images 800A, 800B, and 800C) corresponding to the reference point RP1.

Hence, by utilizing the method for generating the transfer function 600, the transfer function corresponding to each of the reference points (such as the reference points RP1-RP9) in the pattern (such as the pattern 300A) can be obtained. As a result, when the board-warping measuring method 100 is utilized to measure the device under test 250, the position of each of the measurement points in the captured measurement image can be calculated by utilizing the transfer function of the reference point that the each of the measurement points corresponds to so as to rapidly obtain the position heights of the device under test 250 corresponding to the measurement points. In one embodiment, an area of the pattern projected by the projection module 220 may be larger than or equal to an area of the device under test 250 so as to rapidly obtain an approximate overall height of the device under test 250. That is to say, a determination as to whether board warping of the device under test 250 has occurred can be rapidly performed, and the position range of focal length of the image-capturing module 230 can be adjusted rapidly. If board warping of the device under test 250 has occurred, the processing module 240 can rapidly perform height compensation based on the obtained height differences.

It is noted that the position height of the device under test 250 corresponding to the measurement point is obtained through the transfer function in the board-warping measuring method 100 according to the present invention. In another embodiment, users can check a lookup table to obtain the position height of the device under test 250 corresponding to the measurement point. Specifically, calibration compensation can be performed by utilizing the calibration plate to obtain the plurality of calibration images corresponding to a specific pattern before measuring the device under test. Next, the position and the height of each of the calibration points in the corresponding calibration image are recorded in a lookup table. In this manner, when measuring the device under test, the processing module can check the position of the measurement point in the lookup table and obtain a height corresponding to the position of the measurement point once the measurement image is obtained, then determine whether the device under test has undergone board warping and perform compensation. In other words, the board-warping measuring method 100 of the present invention is not limited to obtaining the height of the device under test through the transfer function.

It is noted that, in practical applications, the device under test 250 comprises a printed circuit board, an optical sheet, or another substrate. Solder paste is soldered on the substrate. Since a height of the solder paste is very small relative to a height of the substrate, an error generated by the board-warping measuring method 100 will not cause too significant an effect on the compensation of board warping. Because the board-warping measuring method 100 can obtain the heights of the device under test through a one-time measurement, its efficiency is improved and scan time is shortened significantly when compared with the traditional method for measuring a device under test in which the projection device needs to be moved in sequence.

Figure 9:
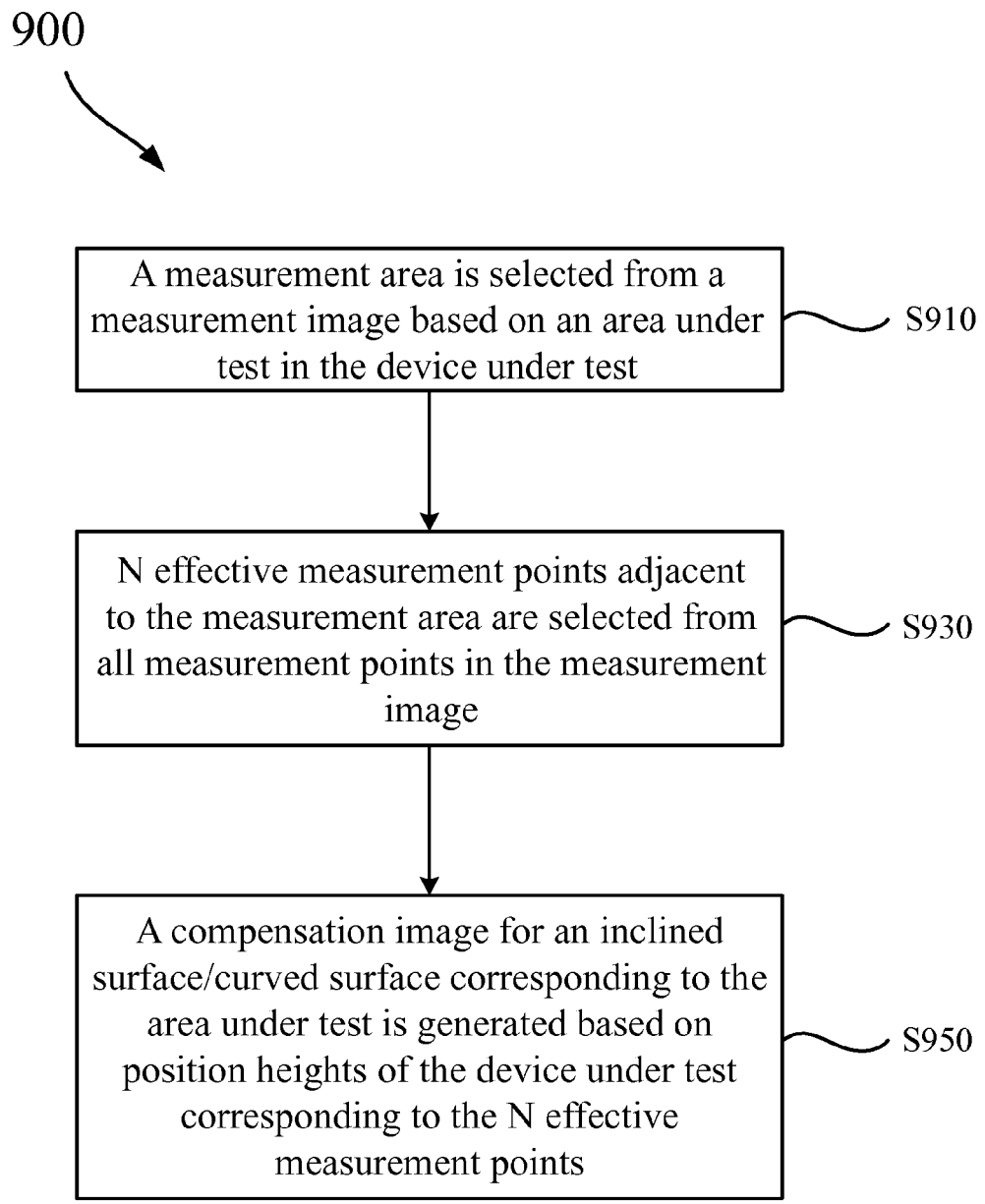
FIG. 9 depicts a flowchart of a method for measuring deformation according to one embodiment of this invention.

In one embodiment, the board-warping measuring apparatus 200 in FIG. 2 can also be utilized to measure deformation of an area under test in the device under test 250 and perform compensation. A description is provided with reference to FIG. 9. FIG. 9 depicts a flowchart of a method for measuring deformation 900 according to one embodiment of this invention. To simplify matters, the method for measuring deformation 900 using the board-warping measuring apparatus 200 in FIG. 2 and the pattern 300A in FIG. 3A is taken as an example, but the present invention is not limited in this regard.

As shown in FIG. 9, first, a measurement area is selected from a measurement image by the processing module 240 based on an area under test in the device under test 250 in step S910. In other words, a position and a range of the measurement area in the measurement image correspond to a position and a range of the area under test. Specifically, users can select the area under test based on the deformation situation of a part of the device under test 250. The processing module 240 can determine the measurement area in the measurement image corresponding to the area under test based on the area under test selected by users.

Next, in step S930, N effective measurement points adjacent to the measurement area are selected from all measurement points in the measurement image by the processing module 240, where N $\geq 3$. Specifically, a plane can be determined as long as there are three points. Hence, whether the measurement area is tilted (that is, an inclined surface is generated) can be determined once three measurement points adjacent to the measurement area are selected. In addition, whether the measurement area is curved (that is, a curved surface is generated) can be further determined if a greater number of measurement points are selected. In other words, those of ordinary skill in the art may select the number of the measurement points depending on practical needs, and the present invention is not limited in this regard.

Subsequently, in step S950, a compensation image for the inclined surface/curved surface corresponding to the area under test is generated based on position heights of the device under test 250 corresponding to the N effective measurement points so as to compensate for the deformation of the device under test 250 in the area under test. Specifically, if the area under test in the device under test 250 has not undergone deformation, then positions of the N effective measurement points in the measurement image should be the same as positions of reference points in a pattern that the measurement image corresponds to. However, if the area under test in the device under test 250 has undergone deformation, deviations are generated between the positions of part of the N effective measurement points and the positions of the reference points in the pattern corresponding to the part or the N effective measurement points. Therefore, the processing module 240 can generate the compensation images for the inclined surface/curved surface based on deviation values of the N effective measurement points to compensate for the deformation of the device under test 250 in the area under test.

Specifically, the processing module 240 is able to calculate the N effective measurement points by utilizing transfer functions of the reference points corresponding to the N effective measurement points to obtain position heights of the device under test corresponding to the N effective measurement points, and determine an inclined value or a curvature value of the area under test in the device under test based on height differences so as to generate the compensation image for the inclined surface/curved surface based on the inclined value or the curvature value.

Figure 10A:
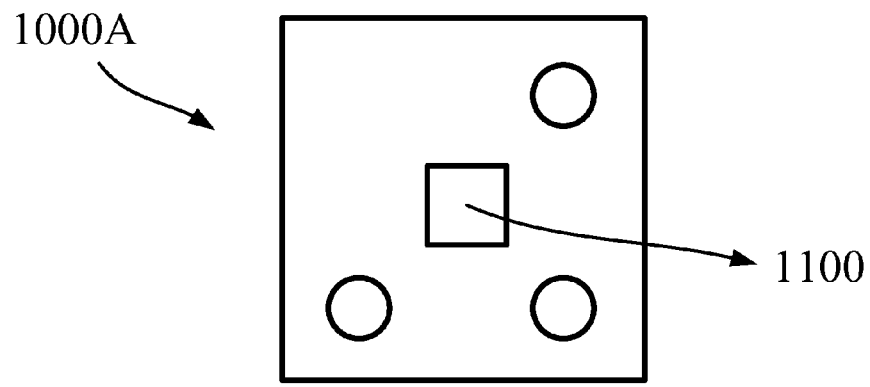
FIG. 10A depicts a schematic diagram of a measurement area in a measurement image according to one embodiment of this invention.
Figure 10B:
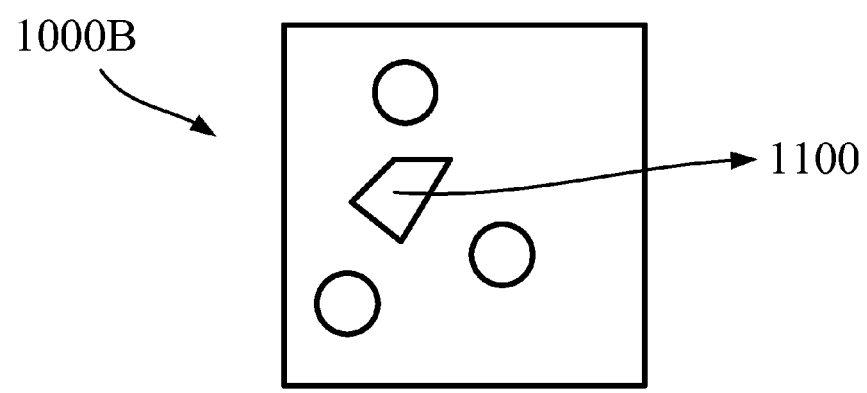
FIG. 10B depicts a schematic diagram of another measurement area in a measurement image according to another embodiment of this invention.
Figure 10C:
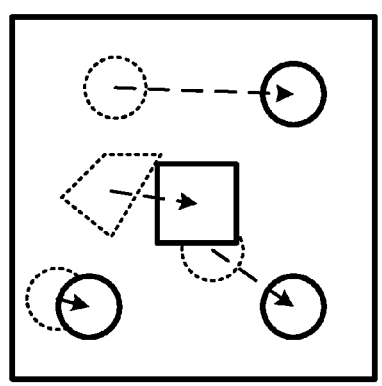
FIG. 10C depicts a schematic diagram of performing compensation by utilizing the method for measuring deformation in FIG. 9 according to one embodiment of this invention.

A description is provided with reference to FIG. 10A, FIG. 10B, and FIG. 10C. FIG. 10A depicts a schematic diagram of a measurement area 1000A in a measurement image according to one embodiment of this invention. FIG. 10B depicts a schematic diagram of another measurement area 1000B in a measurement image according to another embodiment of this invention. FIG. 10C depicts a schematic diagram of performing compensation by utilizing the method for measuring deformation 900 in FIG. 9 according to one embodiment of this invention.

Specifically, if part of the device under test (that is, the area under test corresponding to the measurement area) does not undergo curving or inclination, as shown in FIG. 10A, then positions of measurement points in the measurement area 1000A in the measurement image captured by an image-capturing module do not deviate relative to reference points, and a device 1100 (such as a pad) in the measurement area 1000A does not deform. However, if part of the device under test undergoes curving or inclination, as shown in FIG. 10B, then the positions of the measurement points in the measurement area 1000B in the measurement image captured by the image-capturing module deviate relative to the reference points, and the device 1100 in the measurement area 1000B deforms. Under these circumstances, by utilizing the method for measuring deformation 900 of present invention, a deformation situation can be determined based on deviation values of the measurement points adjacent to the measurement area, and the positions of the measurement points can be corrected to positions corresponding to the reference points to compensate for the deformation situation of the device 1100 and generate a compensation image.

It should be understood that the greater the number of the selected measurement points adjacent to the measurement area is, the more accurate the deformation of the area under test in the device under test can be estimated and the more accurate the compensation image for the inclined surface/curved surface is.

It is noted that if the overall device under test cannot be effectively measured by utilizing a specific pattern, users can choose a pattern in another form to replace the specific pattern. When compared with the traditional method in which the patterns are generated by disposing different optical gratings, the cost required by the method of the present invention can be effectively reduced. For example, if the measurement image captured by the image-capturing module 230 when the pattern 300A is projected onto the device under test does not have the measurement point corresponding to the reference point RP1, users can replace the pattern 300A with another pattern (such as a pattern having sixteen reference points) and project the another pattern onto the device under test, then capture the measurement image generated by projecting the another pattern onto the device under test so as to perform compensation for board-warping of the device under test.

In summary, the board-warping measuring method provided by the present invention utilizes the projection module (such as a digital projection device) to project the pattern having a specific form and the reference points onto the device under test, and rapidly determines whether board warping of the device under test has occurred based on the positions of the measurement points in the measurement image captured by the image-capturing module and the positions of the reference points in the pattern corresponding to the positions of the measurement points, and rapidly adjusts the position range of focal length of the image-capturing module. Next, through the transfer functions or the lookup table, the heights of the device under test can be rapidly obtained, and height compensation can be performed for board warping of the device under test. In addition, by utilizing the method of the present invention for measuring deformation, inclination or curving of part of the device under test can be further determined so as to perform calibrations and compensation accurately.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A board-warping measuring method for measuring a device under test, the device under test being disposed on a measuring carrier, the board-warping measuring method comprising:
    projecting a pattern onto the device under test, wherein the pattern comprises a plurality of reference points;
    capturing a measurement image by an image-capturing module when the pattern is projected onto the device under test, wherein the measurement image comprises a plurality of measurement points respectively corresponding to the reference points;
    calculating a position of each of the measurement points in the measurement image by a processor for utilizing a transfer function corresponding to each of the reference points to obtain position heights of the device under test corresponding to the measurement points; and
    generating a board-warping compensation image corresponding to the device under test by the processor based on the position heights of the device under test corresponding to the measurement points so as to compensate for board warping of the device under test.

2. The board-warping measuring method of claim 1, wherein before measuring the device under test, the board-warping measuring method comprises:
    projecting the pattern onto a calibration plate disposed on the measuring carrier;
    capturing a plurality of calibration images by the image-capturing module when the pattern is projected onto the calibration plate on condition that the image-capturing module has a plurality of calibration heights relative to the calibration plate, wherein each of the calibration images comprises a plurality of calibration points respectively corresponding to the reference points;
    measuring a height of each of the calibration points in the calibration image corresponding to the each of the calibration points; and
    determining the transfer function based on a position and the height of the calibration point in each of the calibration images corresponding to a same reference point.

3. The board-warping measuring method of claim 1, further comprising:
    selecting a measurement area from the measurement image based on an area under test in the device under test;
    selecting N effective measurement points adjacent to the measurement area from the measurement points, where N ≥3; and
    generating a compensation image for an inclined surface/curved surface corresponding to the area under test based on position heights of the device under test corresponding to the N effective measurement points so as to compensate for deformation of the device under test in the area under test.

4. The board-warping measuring method of claim 1, wherein the reference points comprise at least one first reference point and a plurality of second reference points, and a form of the at least one first reference point is different from a form of the second reference points.

5. The board-warping measuring method of claim 1, wherein the pattern comprises a plurality of first lines and a plurality of second lines, and the first lines cross the second lines to form the reference points.

6. A board-warping measuring apparatus for measuring a device under test comprising:
- a measuring carrier configured to carry the device under test;
- a digital projection device configured to project a pattern onto the device under test, wherein the pattern comprises a plurality of reference points;
- a camera configured to capture a measurement image when the pattern is projected onto the device under test, wherein the measurement image comprises a plurality of measurement points respectively corresponding to the reference points; and
- a processor for calculating a position of each of the measurement points in the measurement image by utilizing a transfer function corresponding to each of the reference points to obtain position heights of the device under test corresponding to the measurement points, and generating a board-warping compensation image based on the position heights of the device under test corresponding to the measurement points so as to compensate for board warping of the device under test.

7. The board-warping measuring apparatus of claim 6, wherein before measuring the device under test, the board-warping measuring apparatus is configured to determine the transfer function, the measuring carrier is configured to carry a calibration plate, the digital projection device is configured to project the pattern onto the calibration plate, the camera is configured to capture a plurality of calibration images when the pattern is projected onto the calibration plate on condition that the camera has a plurality of calibration heights relative to the calibration plate, wherein each of the calibration images comprises a plurality of calibration points respectively corresponding to the reference points, the processor is configured to measure a height of each of the calibration points in the calibration image corresponding to the each of the calibration points, and determine the transfer function based on a position and the height of the calibration point in each of the calibration images corresponding to a same reference point.

8. The board-warping measuring apparatus of claim 6, wherein the processor is further configured to select a measurement area from the measurement image based on an area under test in the device under test, and select N effective measurement points adjacent to the measurement area from the measurement points, where N≥4, and generate a compensation image for an inclined surface/curved surface corresponding to the area under test based on position heights of the device under test corresponding to the N effective measurement points so as to compensate for deformation of the device under test in the area under test.

9. The board-warping measuring apparatus of claim 6, wherein the reference points comprise at least one first reference point and a plurality of second reference points, and a form of the at least one first reference point is different from a form of the second reference points.

10. The board-warping measuring apparatus of claim 6, wherein the pattern comprises a plurality of first lines and a plurality of second lines, and the first lines cross the second lines to form the reference points.

11. A board-warping measuring method for measuring a device under test, the device under test being disposed on a measuring carrier, the board-warping measuring method comprising:
- projecting a pattern onto the device under test, wherein the pattern comprises a plurality of reference points;
- capturing a measurement image by an image-capturing module when the pattern is projected onto the device under test, wherein the measurement image comprises a plurality of measurement points respectively corresponding to the reference points;
- checking a position of each of the measurement points in the measurement image in a lookup table by a processor to obtain position heights of the device under test corresponding to the measurement points; and
- generating a board-warping compensation image corresponding to the device under test by the processor based on the position heights of the device under test corresponding to the measurement points so as to compensate for board warping of the device under test.

12. The board-warping measuring method of claim 11, wherein before measuring the device under test, the board-warping measuring method comprises:
- projecting the pattern onto a calibration plate disposed on the measuring carrier;
- capturing a plurality of calibration images by the image-capturing module when the pattern is projected onto the calibration plate on condition that the image-capturing module has a plurality of calibration heights relative to the calibration plate, wherein each of the calibration images comprises a plurality of calibration points respectively corresponding to the reference points;
- measuring a height of each of the calibration points in the calibration image corresponding to the each of the calibration points; and
- recording a position and the height of the calibration point in each of the calibration images corresponding to a same reference point to generate the lookup table.

* * * * *